United States Patent Office 3,605,969
Patented Sept. 20, 1971

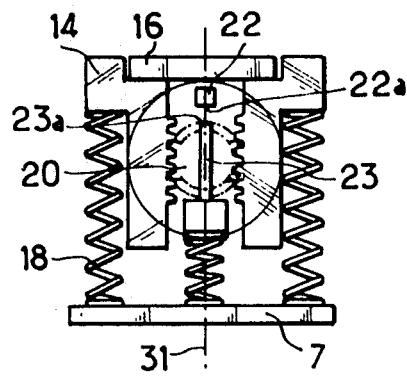
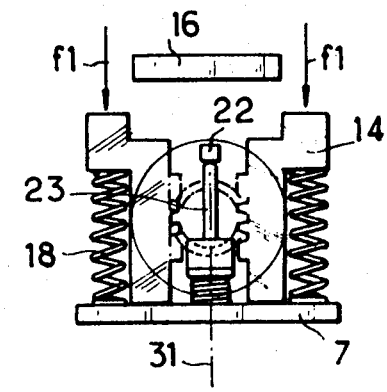
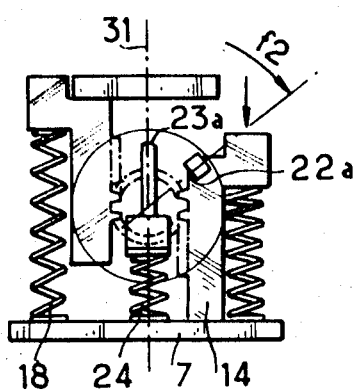
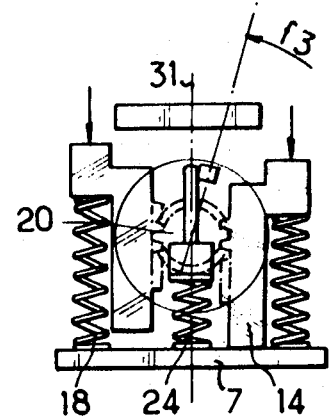

3,605,969
TWO HAND SAFETY DEVICE
Marcel Cornu, Rueil, and Serge Terpin, Nanterre, France, assignors to La Telemecanique Electrique (Societe Anonyme), Nanterre, France
Filed Sept. 15, 1969, Ser. No. 857,898
Claims priority, application France, Sept. 27, 1968, 167,814
Int. Cl. F16p 3/18
U.S. Cl. 192—131R
3 Claims

ABSTRACT OF THE DISCLOSURE

In a safety control for an intermittently operated press and the like, two elongated slide blocks reciprocally mounted on two respective guide blocks, two elongated racks integrally mounted on the respective slide blocks, a toothed wheel mounted for reciprocating translation along the racks and an actuating member integrally mounted on said wheel and cooperating with the clutch of the press only when the slide blocks are simultaneously operated.

This avoids any actuation of the machine through a fraudulent or false working of the operator.

This invention relates to a safety control device, for intermittently operated machines, particularly for presses and the like.

This type of safety control device is, as is well known, designed to oblige the operator to place his hands in a place of safety out of the normal path of movement of the operating periods of the press. For this purpose, the operator must hold his hands on independent control levers or handles whose actuations ensure the putting into operation of the machine only when they are perfectly simultaneous.

A device is known which consists in establishing simultaneity of the independent controls by means of a movable link member placed between two parallel guides separated by an interval and co-operating with the controls. This link member can be a ball maintained in a roller path comprising two housings provided horizontally in the two guides, with one opening onto the other, so that the ball, only in the case of simultaneous operation of the controls, is maintained between the two guides and comes into contact with an actuating rod placed axially in said interval.

This prior art device has the disadvantage of comprising a link member which can circulate freely in the housings since it is not integral with any other component. This member, whose correct operation depends on gravity only, can be influenced by outside forces such as vibrations occurring on the control levers and in no case, can it be used other than in the horizontal position.

It is an object of this invention to avoid the mentioned disadvantages of prior art devices and to provide a device capable of frustrating any fraudulent intention on the part of the operator.

A further object of the invention is to provide a device comprising a toothed wheel acting as a linking member for the guides and engaging, in two diametrically opposed points, two parallel racks integrally fixed to two respective guides, said toothed wheel being mounted for translation in a plane parallel to the direction of the guides and being provided with an actuating wedge which, when the device is at rest, is located in the extention of the sliding control rod, whereby the simultaneous displacement of the two guides induces a displacement of the wedge in a parallel direction and constantly in the axis of said rod onto which it bears.

Thus, the linking member is differentially integral with the guides, which makes it possible to use the apparatus in all positions, the displacement in translation of the toothed wheel depending solely on that imported to the guides.

An additional advantage of the invention is that the maintenance of the wedge in the axis of the control part must be strictly observed. To this effect, in a preferred embodiment of the invention, a certain stroke is effected by this rod before tripping of the control device of the machine and one of the two members which come into contact, i.e. the control rod and the wedge, has a rounded end so that, in case contact of the wedge with the rod does not occur strictly in the axis of these two members, this rounded end amplifies the effect of defective position of this contact so as to induce a lateral sliding of the wedge and thus block the device, so as to cause the operator to return the controls to the resting position and to correctly repeat the maneuvre.

Another advantage of the present device resides in the fact that, since the controls are provided therein as buttons, the transmission of the force exerted on the control button occurs through a point contact of the end of the rod integral with the button with a lever which co-operates with the guides, said rod being both sliding in a guiding bore and rotatable around itself. The device is thus easily adaptable to all housing dimensions by merely changing the length of said rod and makes any attempts at fraud on the part of the operator, for example, by means of a connection between the two buttons, inefficient.

Other objects and advantages of the invention will appear from a consideration of the following description.

In the appended drawings:

FIGS. 3 to 6 are schematic views showing different positions of the operating mechanism of the device during its operation.

Figure 1:
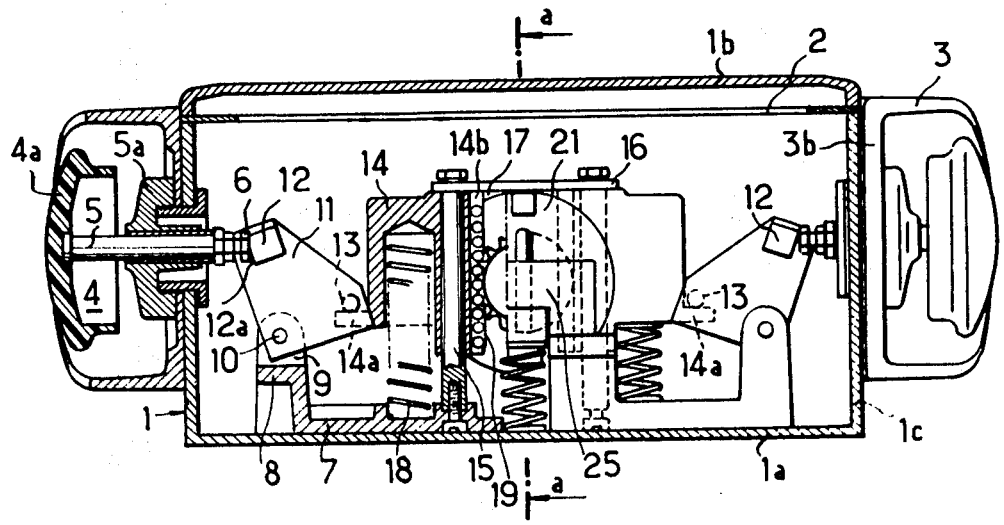
FIG. 1 shows a cross-section of a preferred embodiment of the device according to the invention.
Figure 2:
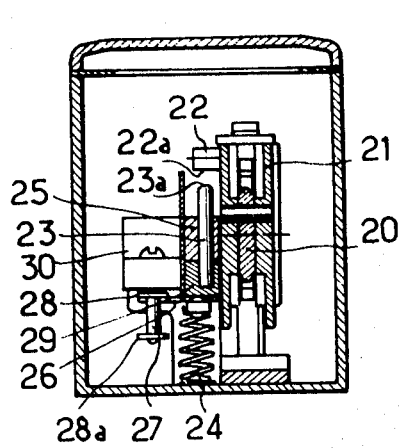
FIG. 2 shows a cross-section of the device along aa of FIG. 1.
Figure 1A:
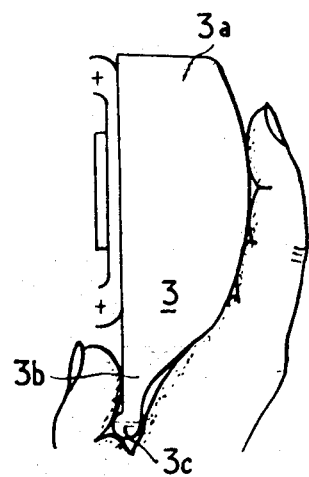
FIG. 1a is a top view of a side bracket of the housing of the said device.

Referring to FIGS. 1 and 2, the device is lodged in a housing 1 comprising a bottom 1a and a cover 1b provided with an air seal 2. A manual bearing bracket 3 is fixedly secured against the external face of each of the two side walls 1c. The bracket 3 is provided with a semi-circular protective guard 3a, open on the operator's side, and with a bearing extension 3b going well beyond the forward vertical wall of the housing. The two brackets are identical and are adapted to the hand of an operator so that the outside rounded portion 3c of extension 3b can suitably contact the palm of the hand and bear against it without wounding it.

Inside each bracket, there is a push button 4 whose bearing face 4a which is slightly rounded has a diameter equal to or larger than the width of all the fingers of one hand. This push button is mounted so as to be free to effect a translation movement by means of a sliding rod 5 which crosses the side wall 1c in which it is guided and maintained freely rotating around itself by a screw-nut assembly 5a on either side of said wall 1c. This sliding rod 5 has a path determined by thrust bearing rings and is provided at its free end with an adjustable stop screw 6 whose abutting face is advantageously rounded.

The device rests on a supporting base 7, fixed into the bottom of the housing and provided with two elevated parts each one terminating in a yoke 9 open towards the top. These parts 8 are arranged symmetrically with respect to the central axis of the housing, yokes 9 being preferably provided at the same height from the bottom of the housing.

In each of the two yokes 9, a transmission lever 11 provided in the form of an angle plate whose right angle supports the axis of rotation 10, while the two ends are provided, on the one hand, with a boss 12 whose plane face 12a co-operates with thrust bearing 6 of the push button, and on the other hand, with a stub 13 which bears against a lateral shoulder 14a of a slide block 14 having a return spring. The boss 12 and stub 13 are defined respectively as first and second mutually perpendicular branches of each lever 11.

It can be noted that the transmission lever 11, when the device is at rest, is advantageously maintained in vertical equilibrium, as shown in FIG. 1, around the axis of rotation 10 between stop screw 6 and shoulder 14a of slide 14 so as to transform, with a minimum of effort and a minimum of wear of the faces involved, the rectilinear displacement of the sliding rod 5 into a rotating displacement of lever 11 around its axis of rotation 10.

The transmission through two faces in contact, one being plane and the other rounded, makes it possible to considerably reduce the pressure by decreasing the surfaces involved in friction and to avoid a rapid wear by displacing the fulcrum on the rounded face as the lever 11 rotates.

If pressure is exerted by the operator on push button 4, this pressure is applied to lever 11, onto boss 12; the rotational movement of this lever around axis 10 is then started and stub 13, in permanent contact with shoulder 14a of slide 14 transmits to said slide the corresponding pressure, thus driving the latter downwards. Each lever 11 thus finally transforms the horizontal displacement of one of the two identical push button-sliding rod assemblies into a perpendicular displacement of one of the two corresponding identical slides 14, so that the two faces opposite said slides are constantly maintained at an equal distance from one another on either side of the central axis of the housing.

The two slides 14 move on guide rods 15 fixed perpendicularly to a supporting base 7 and are maintained parallel to one another through a flange 16, provided at their free end. Maintenance of these slides in the resting position on rods 15 is provided by a return spring 18 bearing against base 7 and guided at each end by guide housings or by any other means known per se. On each of the faces opposite 14b of these slides, separated from each other by a space 17, there is provided over their entire length, a groove housing a rack 19. Each rack is located at the same height so that both are strictly face to face.

In space 17, in the same plane as the slides, a toothed wheel 20 moves, whose teeth engage the parallel racks at two diametrically opposed points, the line joining these points being perpendicular to the two slides. Two disc-shaped flanges 21, located on either side of the two guides 14 and capable of sliding against the lateral faces of the latter, are made integral by keying, pinning or any other known means with the toothed wheel 20, so as to act as a complementary guide to said wheel when the latter moves in space 17. On the outside face of one of these flanges, an actuating wedge 22 is fixed facing, at a certain distance, the free end 23 of a central rod 23 acting as an intermediate control push rod.

Wedge 22 and push rod 23, when the apparatus is at rest, are in the same axis 31 (FIG. 3) parallel to the axis of the guide rods 15 of slides 14, so that a displacement of the slides in the direction of supporting base 7, inducing a corresponding displacement of the toothed wheel-flange assembly, induces at the same time, a displacement of the push rod 23 resiliently mounted on a return spring 24. This push rod 23 is guided in translation in a bore provided through an upside down U shaped part 25 located on base 7 through the end of its two branches, inside which is placed the return spring 24. At the end of the push rod, a driving member or fork 26, perpendicular to said push rod is integral with the latter and drives an elongated means or control rod 27 coming out of a member 30 for the control of the operation of the press.

Member 30 is fixed onto the U shaped part and on rod 27. The driving fork 26 overlaps rod 27 and can carry out a differential stroke determined by two thrust washers 28, whose internal faces 28a, opposite one another, come into contact with fork 26, one as a result of the pressure exerted manually on the mechanism, so that wedge 22 induces the translation of the integral rod-fork assembly, which then pulls on rod 27 and engages the operation of the press, the other as a result of the expanding action of springs 18 and 24. which automatically return the mechanism to a position of rest and ensure, at the same time, during this return, the initial setting into position of rod 27.

Push rod 23, which is integral with fork 26, has a stroke which is at least slightly greater than the differential stroke of rod 27, so that contacting of fork 26 with one of the faces 28a of the thrust washers 28 constitutes the starting of a complementary stroke of the control rod 27 in order to reach one of the control positions of the press operating device. The differential stroke of rod 27, increased by the complementary stroke effected on either side of thrust bearings 28 is equal to or shorter than the stroke of the intermediate push rod 23.

The control member 30, can, for example, be an electric switching device whose opening and closing position for the control circuit corresponds to the two complementary strokes of rod 27 effected on either side of the differential stroke; but, of course, other devices could be used in the same way, such as hydraulic devices, pneumatic or other.

FIGS. 3 to 6 show various operating positions of the device designed to obtain a simultaneous displacement of slides 14 on their guide rod 15. It can be seen that not only must the two actuating forces on both buttons 4 be exerted simultaneously by the operator, but also that compressions of the return springs 18 must be strictly equal. Thus in this simultaneous translation movement of the slides, the toothed wheel 20 also undergoes a displacement parallel to the slides, just as if a linking member were integrally fixed to the slides.

The lateral flanges 21, integral with the toothed wheel 20, then undergo the same displacement so that wedge 22 moves in a parallel direction with the displacement so that wedge 22 moves in a parallel direction with the displacement of slides 14 and is maintained in the axis of the intermediate push rod 23, with the free end 23a of which it enters into contact through face 22a. The distance separating face 22a of the wedge from end 23a is adjustable by means of adjustable stop screws 6 which constitute a limit of the rotary stroke of levers 11 around their axis 10.

FIGS. 3 and 4 show the diagram of the device when the latter is respectively in a resting position and in a synchronized working position. The slides are, in this latter case, simultaneously actuated by two identical parts acting on springs 18. On the condition that the simultaneous displacement of slides 14 is maintained during the entire operation of the device, wedge 22 remains in contact with the end of the intermediate push rod 23, and axis 31 of the latter. It then pushes said push rod, which first carries out a certain safety stroke, making it possible to check the perfect translation of the toothed wheel 20 without any lateral sliding and the perfect setting into place of the wedge in axis 31 of the push rod. This safety stroke corresponds to the intermediate position of fork 26 in the differential path of control rod 27. The push rod then brings the driving fork 26 into contact with the internal faces 28a of thrust washers 28, to finally start the operation or stoppage of the press.

When the displacement of guides 14 is not simultaneous (FIGS. 5 and 6) or stops being so, both as far as actuating push rod 23 and return to the resting position under the action of return springs 18 are concerned, the highest compression exerted on one of the guide springs 14 includes a larger translation of the slide and of the corresponding rack. As a result, the teeth of wheel 20 bearing within said rack, are also driven into this displacement, thus inducing a translation of the toothed wheel 20 and of the components integral with it, with rotation around itself. In this case wedge 22 then describes an arc of a circle on either of the sides of the axis of the intermediate push rod 23 and, because it is not placed and maintained in this axis, face 22a of the wedge cannot meet the rounded end portion 23a of the push rod and thus, carry out the control of the operation of the machine.

If wedge 22 is not strictly within the axis of push rod 23, when the respective faces 22a and 23a are in contact, the safety path of the push rod, before the meeting of driving fork 26 with face 28a of end washer 28, then acts to force the rotation of toothed wheel 20. Indeed, in that case, the displacement of slides 14 is not strictly simultaneous and compression of springs 18 produced by the forces exerted by the push buttons is not equal. This refers generally to the border-line case in which the arrangement of the wedge on the push rod is close to its required arrangement in the push rod axis. This is way the wedge has a tendency to stay in contact with the push rod. But this case must also be avoided since it is an indication of the absence of operating simultaneously on the rounded face 23a of push rod 23. This rounded portion then amplifies, during the safety stroke, the effect of the defective arrangement of the wedge with respect to the push rod axis, and forces it to slide, the force of the return spring 24 being higher than the reaction force of the wedge.

While the slides 14 continue their translation, the sliding of wedge 22 induces a slight rotation of the toothed wheel 20, thus removing the wedge from the push rod axis and cancelling the operation in progress.

In this way, push rod 23 is freed and returns to a resting position under the driving action of return spring 24. It drives in its displacement the driving fork 26 which, eventually comes into contact with thrust washer 28 of control rod 27 so as to automatically return the control device to a non operating position. Thus, if the operator has momentarily freed one of his hands to place it in the dangerous working zone of the machine, or if he has simply slackened off his effort, the operation of said machine is automatically stopped. If the operator persists in operating the device while his hand is pushing on push button 4 located on the side towards which the toothed wheel has pivoted, he will note that he can no longer operate the machine.

Wedge 22 is indeed lower than the end of push rod 23 (FIG. 6) and an action on the opposite push rod causes the wedge to hit against the rod of push rod 23, so that blocking of the mechanism takes place as long as the operator has not released both buttons 4, so that the device may return under the action of spring 18 to a resting position, wedge 22 then assuming again its initial position in the axis of push rod 23.

Thus, it is made impossible for the operator not to carry out a simultaneous action with both hands throughout the entire operation: this ensures maximum safety with respect to accidents since the machine can only operate when both hands of the operator are themselves immobilized into safety and since it is impossible for the latter to slacken his action with one or the other of his hands without this slackening, no matter how small it may be, causing the immediate stoppage of the machine. The thrust bearings of control rod 27 play an important role in this respect, for control of push rod 23 can only occur as a result of the action of wedge 22 until the setting into action of the control device by means of pressure of fork 26 on the terminal thrust bearing 28, maintenance of the latter being a requirement during operation, while return of push rod 23 to a resting position is no longer dependent on the wedge and occurs automatically under the action of the return spring 24, the return of said push rod causing the closure of the press operation control device.

It is self evident that modifications can be introduced into the device that has been described, without departing from the scope of the invention. Thus, for example, the arrangement of the manual control means can vary. These means can be adapted firmly in various positions against the side walls of the housing, but can also be held at a distance through flexible rods.

What is claimed is:

1. A safety control for an intermittently operated machine, said control comprising an actuated rod whose advance movement causes operation of the machine, two parallel elongated guide blocks, two elongated slide blocks reciprocally mounted on the respective guide blocks, two elongated racks integrally mounted on the respective slide blocks, a toothed wheel engaging the two racks at two diametrically opposed points and mounted for reciprocating translation in a direction parallel to the racks, and an actuating member integrally mounted on said wheel on a diameter thereof which is parallel to the said direction and in the extension of the actuated rod when the two sliding blocks are displaced simultaneously.

2. A safety control as claimed in claim 1, said control further comprising two push rods making a predetermined angle with the said direction, two levers each having first and second mutually perpendicular branches, the first branches being engaged by the respective push rods, and the second branches engaging the respective slide along lateral shoulder of said slide blocks.

3. A safety control as claimed in claim 1, said control further comprising a driving member integrally mounted on said actuated rod substantially at right angles thereto, elongated means for controlling the tripping of the machine, two stops mounted at an interval on said elongated means, said driving member cooperating with said stops, said interval being shorter than the maximal advance movement of said actuated rod.

References Cited

UNITED STATES PATENTS

| 2,473,167 | 6/1949 | Mills | 192—131X |
| 3,491,867 | 1/1970 | Alexander | 192—131 |

FOREIGN PATENTS

| 371,893 | 6/1939 | Italy | 192—131 |
| 562,409 | 5/1957 | Italy | 192—131 |

ALLAN D. HERRMANN, Primary Examiner

U.S. Cl. X.R.

100—53